March 18, 1930.  T. E. THOMPSON  1,750,977
EDUCATIONAL DEVICE
Filed Aug. 5, 1926  4 Sheets-Sheet 1

Fig. 1.

No. 2.  ADDITION - AG - 29-31-23-22-57-48

Fig. 2.

No. 2   Addition   John Wilson

| 29 | 34 | 23 | 56 | 22 | 34 | 48 | 34 |
| 56 | 31 | 56 | 22 | 34 | 57 | 34 | 48 |
| 31 | 41 | 23 | 56 | 22 | 41 | 48 | 56 |
| 41 | 29 | 41 | 23 | 24 | | | |
| 29 | 24 | 31 | 40 | | | | |
| 24 | 29 | | | | | | |

INVENTOR:
THOMAS E. THOMPSON.
BY
Ford A. Harris
ATTORNEY.

March 18, 1930.  T. E. THOMPSON  1,750,977
EDUCATIONAL DEVICE
Filed Aug. 5, 1926   4 Sheets-Sheet 2

INVENTOR:
THOMAS E. THOMPSON,
BY
ATTORNEY.

March 18, 1930.   T. E. THOMPSON   1,750,977
EDUCATIONAL DEVICE
Filed Aug. 5, 1926   4 Sheets-Sheet 3

INVENTOR:
THOMAS E. THOMPSON,
BY
ATTORNEY.

March 18, 1930. T. E. THOMPSON 1,750,977
EDUCATIONAL DEVICE
Filed Aug. 5, 1926  4 Sheets-Sheet 4

INVENTOR:
THOMAS E. THOMPSON,
BY
Ford H. Harris
ATTORNEY.

Patented Mar. 18, 1930

1,750,977

UNITED STATES PATENT OFFICE

THOMAS E. THOMPSON, OF LOS ANGELES, CALIFORNIA

EDUCATIONAL DEVICE

Application filed August 5, 1926. Serial No. 127,283.

My invention relates to educational devices, and although useful in teaching many subjects, is particularly useful in mathematics.

One valuable use of my invention is in schools. It is ordinary practice to have the pupils write the problems and the answers on a sheet and hand them in for correction. The instructor must carefully check over all the answers, particularly because the problems and answers are not arranged in the same order on each sheet.

It is an object of this invention to provide an educational device in which the answers to the problems may be expeditiously and accurately checked.

It is a further object of my invention to provide an exercise sheet having perforations therein so that this exercise sheet may be placed over a blank work sheet, the answers being written on the blank sheet through the perforations in the exercise sheet, thus enabling the printed exercise sheets which are relatively expensive to be used over and over again.

It is a further object of my invention to provide a correction sheet by means of which the correctness or incorrectness of the written answers can be quickly and easily determined.

Further objects and advantages will be made evident hereinafter.

Referring to the drawings which are for illustrative purposes only,

Fig. 1 is a view of a perforated exercise sheet embodying an addition test as it appears when laid over a work sheet.

Fig. 2 is a view of a portion of the work sheet, shown in Fig. 1, with answers written thereupon as it appears when the exercise sheet is removed therefrom.

In the form of the invention shown in Figs. 1 to 4, a test in addition having sixty-four examples is shown. This test is printed on an exercise sheet 11 which has perforations 12 through which the answers may be written. The exercise sheet is laid over a work sheet 13 and the answers such, for example, as that shown at 14 are written through the perforations onto the work sheet, the work sheet when completed having the appearance shown in Fig. 2.

As will be noted in Fig. 1, the holes 12 in the exercise sheet 11, through which the answers are written on the work sheet, are disposed in eight straight rows with eight holes in each row so that the entire group of sixty-four holes forms a square. Thus the answers written upon the work sheet through these holes occupy identical positions upon the work sheet as the holes 12 occupy upon the exercise sheet.

Figure 3:
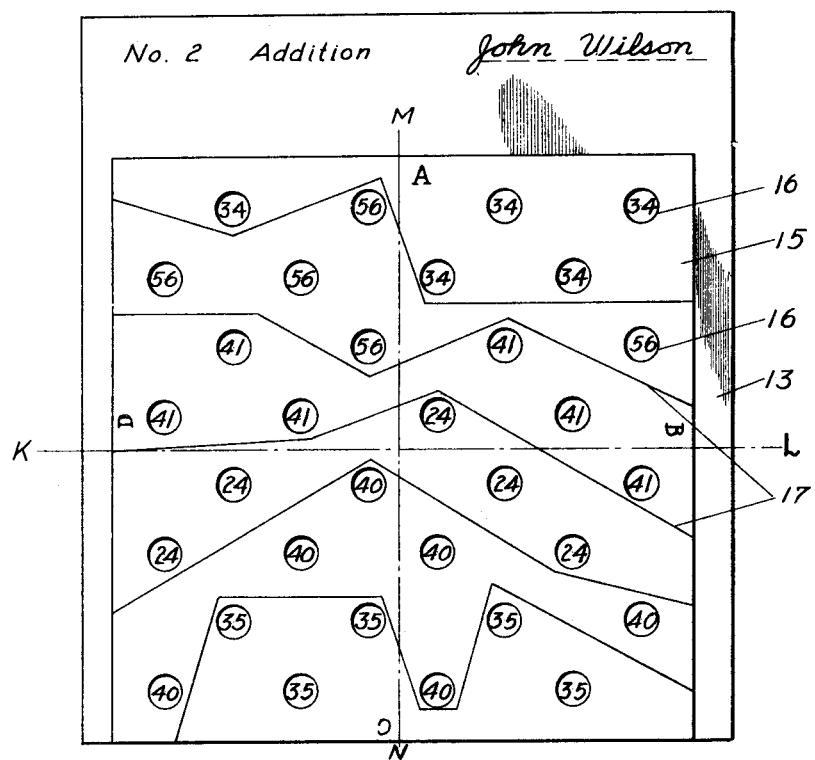
Fig. 3 is a view of the correction overlay which is used with the sheets shown in Figs. 1 and 2, this overlay being shown in one position on the work sheet.

It will be evident that the exercise sheet 11 may be used repeatedly by different pupils, the work sheets 13 being turned in to the teacher to be corrected or these work sheets may be corrected by the pupil doing the work or by another pupil. This correction is very readily accomplished by the correction overlay 15, shown in Figs. 3 and 4. This correction overlay consists of a sheet of relatively stiff paper having open holes 16 therein. The holes 16 in the overlay are so positioned that when the overlay 15 is placed upon the work sheet, as shown in Fig. 3, the even numbered answers on the work sheet, measuring from the left, in the first, third, fifth and seventh horizontal rows are each superimposed by one of the holes 16. Likewise, the odd numbered answers in the second, fourth, sixth and eighth horizontal rows of answers are each superimposed by one of the holes 16. Thus one-half of the answers on the work sheet may be viewed through the holes 16 of the overlay when it is positioned as shown in Fig. 3.

Figure 4:
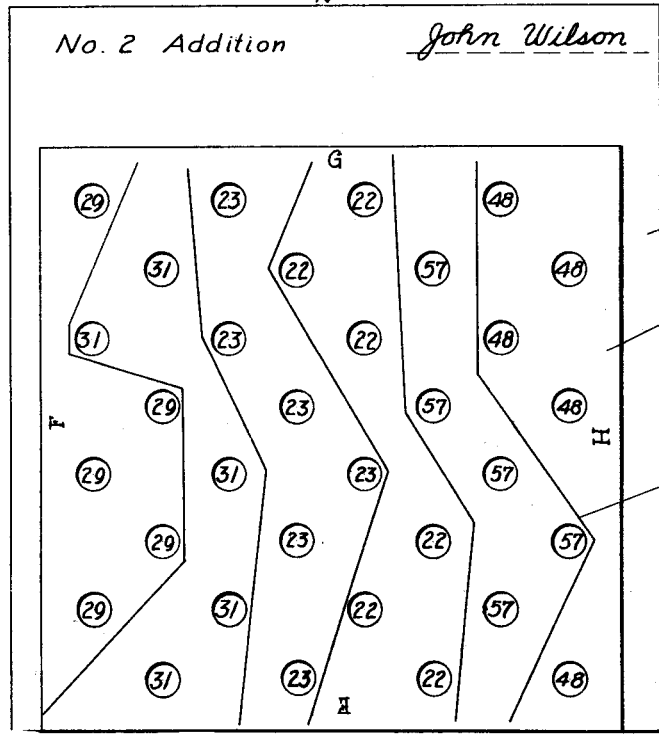
Fig. 4 is a similar view of a portion of the same overlay in a second position on the same work sheet.
Figure 5:
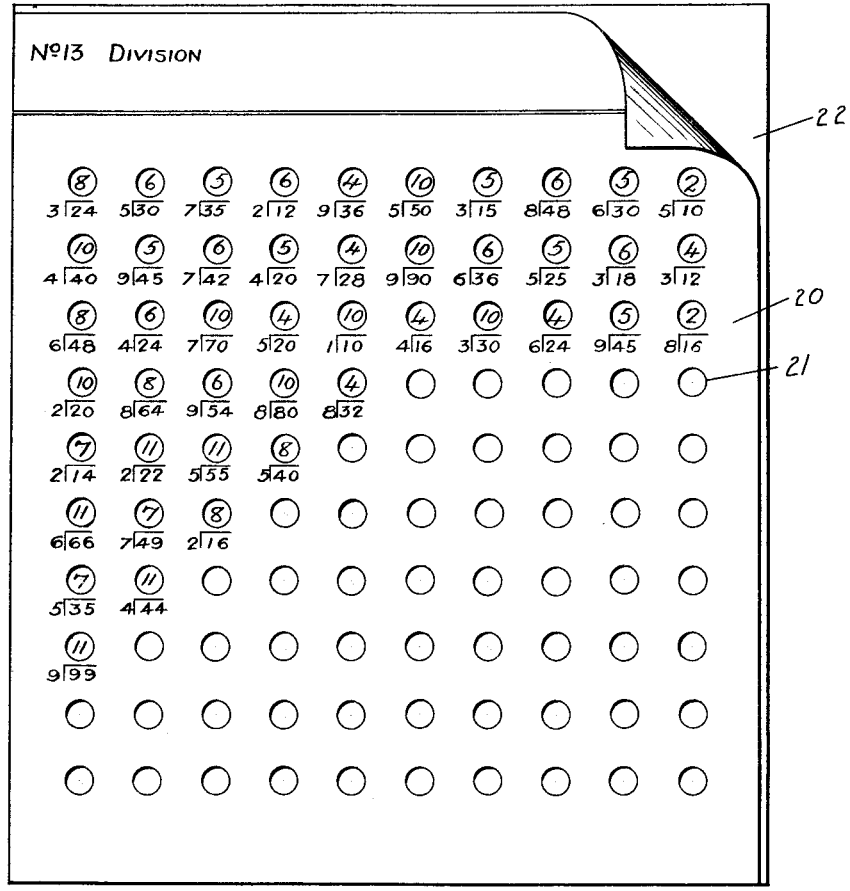
Fig. 5 shows an exercise sheet relating to a test in division as applied to a work sheet.

Due to the disposition of the holes 16 just described, the overlay 15 may be moved from the position in which it is shown in Fig. 3 so as to be rotated a half revolution about the axis K—L and readjusted so that the holes 16 will all register with answers written on the work sheet. Now the half of the answers which were concealed by the overlay when it was disposed as shown in Fig. 3 will each have a hole 16 superimposed over it and will be visible through the hole. In Fig. 4, the overlay 15 is shown in the position just described.

For the purpose of identifying the four edges of the overlay 15 on the two faces thereof, a capital letter is printed upon the overlay on each of these edges. Thus these edges on the side visible in Fig. 3 are lettered A, B, C and D, while the edges on the reverse side of the overlay 15 as shown in Fig. 4 are lettered E, F, G and H. In three other positions of the overlay 15 the same answers are revealed as when the edge G is at the top of the overlay as shown in Fig. 4. In these positions the edges B, D or E is at the top. Likewise, the same half of the answers as are shown when the edge A is at the top will be revealed when one of the edges C, F or H is at the top.

In order to view all of the answers through the holes 16 of the overlay 15, it is therefore necessary that the overlay be placed upon the work sheet first with one of the letters A, C, F or H disposed at the top and then to move the overlay, placing it a second time over the work sheet in such a position that one of the letters B, D, E or G is disposed at the top. A great many different combinations may thus be obtained between the four primary positions of the overlay 15, one of which is shown in Fig. 3, and the four secondary positions of the overlay, one of which is shown in Fig. 4.

There are two distinct results which it is desired to obtain by the use of this invention. The first of these is speed in correcting the answers written by the student. The second result is to provide means for varying the simple checking means, whereby the pupil will be unable to acquaint himself with the checking means sufficiently to utilize it in determining the answer to problems before they are worked.

To secure these results a series of zig-zag lines 17 are printed upon the face of the overlay, shown in Fig. 3, so as to divide the space upon this side of the overlay 15 into irregular fields, the longitudinal axes of which are disposed in the same general direction. When the overlay 15 is disposed so that A or C is at the top, the fields formed between the lines 17 may be passed through consecutively, moving in a vertical direction across the overlay 15; while if the overlay were disposed with B or D at the top, the fields formed between lines 17 could be passed through consecutively only by crossing the overlay in a horizontal direction. In a similar manner lines 18 are formed upon the reverse side of the overlay 15, as shown in Fig. 4, so as to divide the reverse side of the overlay into contiguous fields which may be consecutively passed over by travelling across this face of the overlay in a single direction, this direction being horizontal if E or G is at the top and vertical if F or H is at the top.

The key by which the work sheets may be corrected by use of the overlay is printed upon each of the exercise sheets 11 in the upper margin thereof as shown in Fig. 1. This key consists, first, of two letters which indicate the two positions in which the overlay is to be disposed upon the work sheet or for the checking of the answers thereon. The letters A and G, as shown on the exercise sheet illustrated in Fig. 1, thus indicate that the letter A of the overlay sheet is to be disposed at the top in the first position of the overlay, and that the letter G is to be disposed at the top in the second position of the overlay, the two positions of the overlay being necessary as before stated for the complete checking of the work sheet 13. The second element of the key for each exercise sheet consists of a horizontal line of numerals and a vertical column of numerals. In the example shown, when the overlay is disposed first with the letter A at the top, it is noted that the fields formed between the lines 17 are disposed in vertical relationship relatively to each other. It is thereupon clear to the checker that the vertical column of numerals on the exercise sheet contains the answers which are revealed through the holes 16 when the overlay 15 is in this position.

The problems upon the exercise sheet are so devised that the correct answers thereto which are revealed in each of the fields of the overlay, when it is correctly positioned, will all be alike. Thus in the uppermost of these fields, shown in Fig. 3, each of the answers revealed to view is 34. In the next field the correct answer is 56, in the next 41, and so on. As before stated, the correct answers for these fields will be found in the vertical column of numerals on the exercise sheet, and they are disposed in the same vertical relationship to each other as the fields to which they pertain. When the checker has checked all of the answers shown when the overlay is positioned with A at the top, the overlay is rotated about the axis K—L so as to bring the edge G at the top. The fields formed by the lines 18 are now seen to be in horizontal relationship relative to each other and the answers shown through the holes 16 in each of these fields are checked with the correct answer in the horizontal line of numerals on the exercise sheet which corresponds in position with that field. In this manner the checking of sixty-four answers can be done in a very small fraction of the time which would otherwise be required.

In Figs. 5, 6, 7 and 8, a problem in division is disclosed in which an exercise sheet 20 having one hundred open holes 21, formed in the shape of a square, is employed over a work sheet 22 in the same manner as the exercise sheet 11 in Fig. 1.

Figure 6:
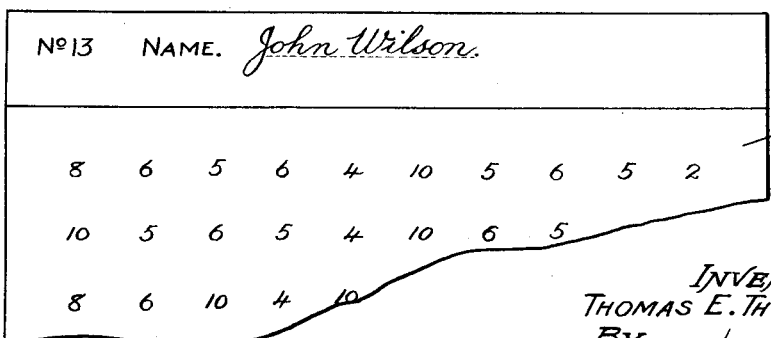
Fig. 6 is a view of the work sheet shown in Fig. 5.

In Fig. 6 a portion of the work sheet 22 is shown with the exercise sheet 20 removed therefrom.

Figure 7:
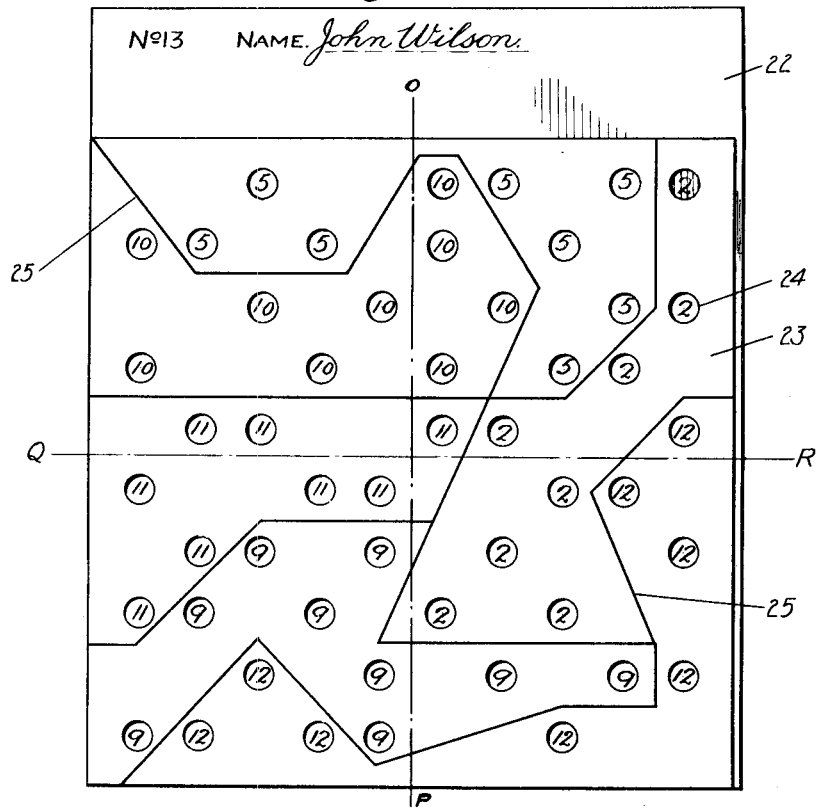
Fig. 7 is a view of a modified form of correction overlay as applied to the work sheet in Fig. 6.
Figure 8:
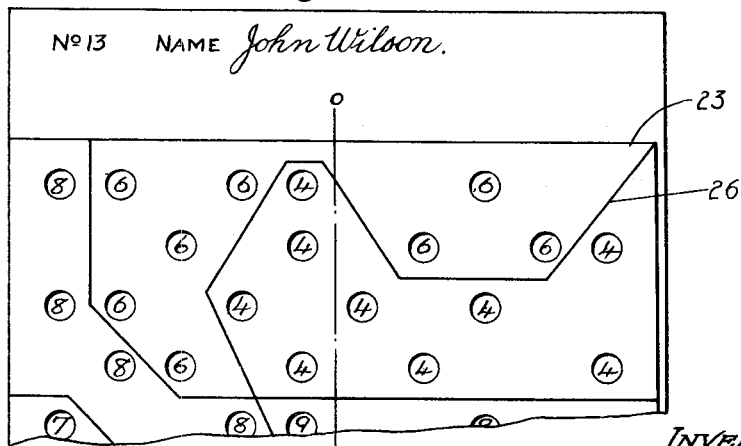
Fig. 8 is a similar view of a portion of the same overlay applied to the same work sheet but in a different position.

In Fig. 7 an overlay 23 is shown disposed over the work sheet 22. The overlay 23 has an irregular group of holes 24 punched therein. These holes are so disposed that one-half of the answers on the work sheet 22 are revealed when the overlay is positioned as shown in Fig. 7; the other half of the answers being shown when the overlay 23 is rotated half a revolution about the axis O—P or the axis Q—R and adjusted in place as shown upon the work sheet 22. The space in the face of the overlay 23 exposed to view in Fig. 7 is divided into various fields by groups of lines 25. These lines 25 have complementary lines 26, as shown in Fig. 8, printed upon the reverse face of the overlay 23 so that all portions of the lines 26 are juxtaposed to corresponding parts of the lines 25 and are co-extensive therewith on the opposite side of the overlay. Problems upon the exercise sheet 20 are so devised that the group of answers in each of the various fields formed by the lines 25 and 26, for given checking positions of the overlay 23, correspond in quantity. With the overlay 23 it is not contemplated to use a key as used with the overlay 11, but such a key could be used if desired. Obviously, when all of these answers in a given area are exposed it will be fairly evident to the checker that the largest number of similar answers in each space is most likely to indicate the correct quantity for all of the answers shown in that space.

As an indication of the method by which the overlay shown in Figs. 7 and 8 was made, it is desired to call the attention to the fact that if this overlay were folded on either the axes O, P, or Q, R, the holes 24 in the halves of the overlay folded against each other would unite to assume the same order as a corresponding number of the answers marked on the work sheet 22 which are adapted to be corrected by the use of this overlay. The character of the overlay 23 which makes it possible for the holes 24 to assume this relation when the overlay is folded about either of these axes is a vital feature of this invention and makes it possible for this overlay in one position to disclose one-half of the markings, and in another position, with the same face turned upward, to disclose the other half of the markings on the work sheet 22.

While I have shown my invention applied to problems in addition and division, it is obvious that it may be applied to other arithmetical problems or that it may be applied to problems in which the missing part is not an answer or not a number. I, therefore, wish my invention to be limited only in scope by the annexed claims.

I claim as my invention:

1. A correction overlay comprising: a sheet having defined spaces through which a portion of a field of markings placed in a given order on an exercise sheet may be viewed, each space being so situated on said overlay that it would register with a vacant area between spaces on the opposite side of said overlay sheet were the sheet to be folded along a central axis so that the spaces of the two folded portions of the overlay would unite to assume the same order as a corresponding number of said markings.

2. An exercise sheet comprising: a sheet; and two series of exercises arranged in a given area on said sheet, each series being so arranged that like answers are grouped together within predetermined subdivisions of said area, the exercises of one series being interpolated among the exercises of the other series.

3. In combination: an exercise sheet having a series of exercises printed thereon, each exercise being adjacent to a perforation through which an answer may be written on a work sheet; a correction overlay having defined spaces through which some of said answers may be viewed and markings on said correction overlay that provide a key to the correctness of said answers.

4. In combination: an exercise sheet having a series of exercises printed thereon, each exercise being adjacent to a perforation through which an answer may be written on a work sheet; and a correction overlay having defined spaces through which some of said answers may be viewed, said spaces being grouped into defined areas, all of the correct answers in any area being identical with each other.

5. In combination: an exercise sheet having exercises printed thereon and defined spaces in which the answers to said exercises may be written; and a correction overlay having defined spaces through which some of said answers may be viewed, said spaces being grouped into defined areas, all of the correct answers in any area being identical with each other.

6. A correction overlay comprising: a sheet having defined spaces through which a fraction of a group of markings on an exercise sheet may be viewed when said overlay is superposed thereover in a given position, and through which another fraction of said group of markings, exclusive of said first fraction, may be viewed when said overlay is turned a quarter revolution about a central point therein.

7. A correction overlay comprising: a sheet having defined spaces through which a fraction of a group of markings on an exercise sheet may be viewed when said overlay is superposed thereover in a given position, and through which another fraction of said group of markings, exclusive of said first fraction, may be viewed when said overlay is superposed over said exercise sheet in a different given position.

8. In combination: a plurality of exercise sheets, each having exercises printed thereon and defined spaces in which the answers to said exercises may be written; a correction overlay having defined spaces through which some of said answers may be viewed, said spaces being grouped into defined areas arranged to be viewed in a simple consecutive order, all of the correct answers in any area being identical with each other; and a plurality of indicia provided upon each exercise sheet in the same relative order in which said areas are disposed when said overlay is in a correcting position, each of said indicia indicating the correct answer which should appear in one of said areas.

9. A correction overlay comprising: a sheet having defined spaces through which an interpolated half of a group of markings on an exercise sheet may be viewed when said overlay is superposed thereover in any one of four primary correcting positions, and through which the other half of said group of markings may be viewed when said overlay is superposed thereover in any one of four secondary correcting positions, opposite faces of said overlay being divided into definite areas, the defined spaces in each of the areas revealing a unique portion of said group of markings for each position of said overlay in which said area is on the upturned face thereof.

10. A correction overlay comprising: a sheet having defined spaces through which an interpolated half of a group of markings on an exercise sheet may be viewed when said overlay is superposed thereover in any one of four primary correcting positions, and through which the other half of said group of markings may be viewed when said overlay is superposed thereover in any one of four secondary correcting positions, two of said primary positions and two of said secondary positions being had with each one of the opposite faces of said overlay upturned, opposite faces of said overlay being divided into definite areas, the defined spaces in each of the areas revealing a unique portion of said group of markings for each position of said overlay in which said area is on the upturned face thereof.

11. A correction overlay comprising: a sheet having defined spaces through which an interpolated half of a group of markings on an exercise sheet may be viewed when said overlay is superposed thereover in any one of four primary correcting positions, and through which the other half of said group of markings may be viewed when said overlay is superposed thereover in any one of four secondary correcting positions, two of said primary positions and two of said secondary positions being had with each one of the opposite faces of said overlay upturned, the overlay being turned one-half turn in its plane and about its center to move it from one to another of any one pair of its like positions with a given face upturned, opposite faces of said overlay being divided into definite areas, the defined spaces in each of the areas revealing a unique portion of said group of markings for each position of said overlay in which said area is on the upturned face thereof.

12. A correction overlay comprising: a sheet having defined spaces through which an interpolated half of a group of markings on an exercise sheet may be viewed when said overlay is superposed thereover in any one of four primary correcting positions, and through which the other half of said group of markings may be viewed when said overlay is superposed thereover in any one of four secondary correcting positions, two of said primary positions and two of said secondary positions being had with each one of the opposite faces of said overlay upturned, the overlay being turned one-half turn in its plane and about its center to move it from one to another of any one pair of its like positions with a given face upturned, said overlay being rotated one-half revolution about one of its diagonal axes to move it from any given position with a given face upturned to one of the two like positions with the opposite face upturned, opposite faces of said overlay being divided into definite areas, the defined spaces in each of the areas revealing a unique portion of said group of markings for each position of said overlay in which said area is on the upturned face thereof.

In testimony whereof, I have hereunto set my hand at Los Angeles, California, this 28th day of July, 1926.

THOMAS E. THOMPSON.